United States Patent Office 2,801,154
Patented July 30, 1957

2,801,154
PREPARATION OF METAL CYANATES

David O. De Pree, Royal Oak, and Kenneth L. Lindsay, Birmingham, Mich., assignors to Ethyl Corporation, New York, N. Y., a corporation of Delaware No Drawing. Application December 31, 1953, Serial No. 401,710

7 Claims. (Cl. 23—75)

This invention pertains to a process for the manufacture of inorganic chemicals and is particularly concerned with the manufacture of the inorganic cyanates.

Inorganic cyanates, particularly the alkali or alkaline earth metal cyanates, have been prepared by the reaction of urea or the reaction of ammonia and carbon dioxide with their salts and bases. These processes have had particular disadvantage and limited applicability since low yields are obtained and the purity of the product has not been favorable. The production of the cyanates by reacting the salts or bases with urea is considerably hindered because the formation of by-products and side reactions presents difficulty in their separation from the final product and thereby decreases yield and purity. Yields in excess of about 85 percent and high purity of the products are not readily obtainable. Generally speaking, the product has been separated from the reaction mixture by recrystallization in alcohol-water solutions or in water alone. This recrystallization is satisfactory only to a limited extent inasmuch as hydrolysis of the product occurs and the yield is therefore reduced. Similarly, low yields and purity are inherent when amonia and carbon dioxide are reacted with the inorganic salts or bases. In addition, the latter process has the disadvantage of requiring high temperatures and pressures. Therefore, a process which would produce the inorganic cyanates in high purity and high yield and overcome the above disadvantages would be of particular benefit to the art.

It is an object of the present invention to provide a new and novel process for the production of alkali and alkaline earth metal cyanates. A further object is to provide a process for the production of alkali and alkaline earth metal cyanates in high yield and purity. A still more specific object is to prepare calcium cyanate by reaction of calcium oxide with finely divided urea. A still further object of this invention is to provide a continuous process for the manufacture of these products. These and other objects will become apparent from the discussion hereinafter.

The above and other objects of this invention are accomplished by premixing a basic metal compound selected from the group consisting of alkali and alkaline earth metal compounds with a finely divided urea and heating this premix. It has been found that when alkali or alkaline earth metal compounds are premixed with a urea whose physical structure is such that particle sizes are less than about 20 microns, high purity metal cyanates are produced in high yields. A particular embodiment of this invention comprises premixing the metal compound, especially the oxide, with finely divided urea wherein both reactants consist of particle sizes less than 20 microns and preferably less than 5 microns, and heating this premix to a temperature not above about 200° C., preferably between about 140 and 180° C. A still more specific mode of conducting this process comprises forming a layer of the premixed solid reactants not exceeding about 2 inches in thickness and heating this layer to the reaction temperature as above.

One of the advantages of this process is that by insuring more complete and intimate mixing of the reactants, a higher purity product is produced in higher yields than other processes heretofore known. Additionally, the necessity of further treatment or purification is not required. The latter feature is especially attractive since the economics and efficiency of the process are well suited to commercial operation.

To demonstrate the process of this invention, the following examples are presented wherein all parts and percentages are by weight.

Example I

A premix of 56 parts of calcium oxide and 120 parts of urea were passed through a hammer mill to result in a mixture of particles of these materials whose size was not greater than 13 microns. This premix was then added to a reaction vessel and the temperature was raised to 170° C. The reaction mixture was maintained at this temperature for about 50 minutes and the volatilizable materials, namely water and ammonia, were permitted to escape to the atmosphere. At the end of this period, a solid product remained which was analyzed without further treatment. The analysis of the product was 84 percent calcium cyanate, and the yield was greater than 90 percent of the theoretical.

Example II

About 480 parts of urea was ground in a hammer mill to a particle size below about 20 microns. This ground urea was then blended and mixed with 224 parts of calcium oxide. The blended stock was then re-ground in a hammer mill to result in a mixture of urea and calcium oxide in which the particle sizes were less than 5 microns. About 50 parts of this mixture was placed in a reaction vessel and heated to a temperature between about 170 and 180° C. The reaction mixture was maintained at this temperature for 50 minutes and the volatilizable materials were permitted to escape. At the completion of this period, the solid product remaining in the reaction vessel analyzed 91.5 percent calcium cyanate. The yield of the product was greater than 92 percent of the theoretical.

Example III

Another 50 parts of the mixture of calcium oxide and urea prepared in the preceding example was spread in a layer, whose thickness was about ¼ inch, over a preheated flat surface. This flat surface and the reactants were maintained at a temperature between about 175 and 180° C. for about 15 minutes. The ammonia and water were again permitted to escape. At the end of the reaction period, the solid product remaining had an analysis of 91.9 percent calcium cyanate, while the yield was greater than 92 percent of theoretical.

From the foregoing examples it can be seen that the product obtained is of higher purity as the particle size of the reactants, especially urea, is decreased. In contrast, when the particle size of the urea is above about 20 microns in the premix, yields and purity above about 80 percent are not obtained. Similarly, temperatures in excess of about 200° C. result in a product of lesser purity since undesirable side reactions occur.

As mentioned above, alkali or alkaline earth metal compounds can be reacted with the urea in accordance with the process of this invention to produce the corresponding cyanates. Among such metal compounds are the metal oxides, carbonates, bicarbonates, hydroxides, hydrides, carbides, alcoholates, amides, and the like. Although any of the aforementioned alkali or alkaline earth metal compounds can be employed, it is preferred to utilize the alkali and alkaline earth metal oxides, carbonates, and hydroxides. Among the metal compounds which we can employ and prefer are: sodium, potassium, lithium, rubidium, and cesium oxides, carbonates, and hydroxides; and beryllium, magnesium, calcium, strontium, and barium oxides, carbonates and hydroxides. Thus, sodium oxide is reacted with urea to produce sodium cyanate. Similarly, when potassium oxide is reacted with urea according to the process of this invention, potassium cyanate is produced in high yield and purity. Likewise, calcium carbonate reacts with urea by this process to produce calcium cyanate. In addition, the alkali metal or alkaline earth metal hydroxides can be reacted with a urea as set forth by this invention to produce the cyanates. Moreover, other alkali or alkaline earth metal compounds as set forth previously can be employed. Further, thiourea can be substituted for urea in the foregoing and other examples to produce the corresponding thiocyanates. Thus, the term urea is intended to relate to urea itself and thiourea. Accordingly, the corresponding cyanates obtainable from urea and thiourea are intended by the term "cyanates." That is, when an alkali or alkaline earth metal compound is reacted with thiourea, the corresponding alkali or alkaline earth metal thiocyanate will be prepared.

The particle size of the metal compound employed is preferably below about 13 microns, although particle sizes up to about 30 microns can be employed. For best results, particle sizes less than about 5 microns should be employed.

The particle size of the urea is important and should be less than about 20 microns, preferably below about 5 microns in size. In spite of the fact that the reaction is a solid-liquid reaction, it has been found that the particle size of the urea prior to melting is important with respect to producing a product of high yield and high purity. Generally speaking, as the particle size of the urea employed is decreased, the purity and yield of the product are increased. Apparently, the described smaller particle sizes prevent the occurrence of side reactions of the urea which result in products non-reactive with the metal compound. The use of the smaller particle sizes and the pre-blend of the reactants essentially avoids or prevents the competing reactions which result in products of lesser purity and reduced yield.

The appropriate particle size of the reactants can be achieved by any method such as grinding, spray drying, controlled precipitation, or the like. Likewise, the reactants can be reduced to appropriate particle size separately and then blended, or blended and then reduced to the desired particle size.

The temperature at which the reaction is conducted is important and temperatures less than about 200° C. are generally employed. In a preferred embodiment, the temperature of the reaction is maintained between about 140 and 180° C. Best results are achieved when the temperature is between about 160 to 180° C. It has been found that temperatures in excess of 200° C. are not desirable inasmuch as deleterious side effects result and a reduced yield will be obtained. Similarly, temperatures below about 140° C. result in prolonged reaction times and similar side effects which result in lower yield and purity.

The reaction period to be employed in the process of this invention is not critical. The reaction time for example, can be for many hours, or, when a continuous process is employed, as short as about ½ minute. In a preferred embodiment, the reaction time is maintained between about 1 minute and 60 minutes.

As noted in the above examples, stoichiometric quantities of the reactants are employed. However, the proportion of the reactants can be varied. Best results are achieved when between about the stoichiometric quantity of the urea required to react with the basic metal compound is employed, and about 10 percent in excess of that quantity. No particular advantage is achieved when the quantity of the urea is substantially beyond 10 percent in excess. However, quantities less than the stoichiometric amount of urea will result in decreased yield and purity of the product.

The thickness of the mixture of reactants has been found to be important for producing a product of high yield and purity with short reaction periods. In a preferred embodiment, irrespective of the type of reactor employed, the thickness of the solid mixture of reactants maintained below about 2 inches. Best results are achieved when the thickness oft he mixture of reactants is less than about ½ inch. Employing thicknesses as just described permits ready removal of the volatile constituents. If desired, the system can be enclosed and a vaccum employed so as to assist in removing these constituents. Removal of the volatile constituents is important, particularly in those cases where water is a by-product, since water will hydrolyze the product thereby reducing yield and purity.

The surface upon which the premixed reactants are reacted can be, for example, a rotary drum, a linked belt surface, multiple pan conveyer, and the like, or it can be an inner surface as, for example, the interior of a rotary drum. Still other examples will be apparent.

The process of this invention is readily adaptable to a continuous system. For example, the individual reactants can be ground separately, conveyed to a blender or mixer, conveyed to a heated rotary drum or similar surface to carry out the reaction, and then the solid product is withdrawn from this surface continuously. If desired, the volatile consituents can be recovered. Still other modifications of this process and its applicability to a continuous operation will be apparent to those skilled in the art.

The process of this invention has particular utility in that it provides an economical procedure for producing the cyanates in high yield and purity. The products obtained by this process are well known and are employed for example, in the treatment of fabricating materials, such as steel, for case hardening. Further, they can be reduced to form the corresponding cyanides and employed as chemical intermediate for the preparation of other useful chemicals, such as, for example, the urethanes, other metal cyanates, and the like. Potassium cyanate, one of the products obtainable by this process, is a known agricultural chemical. Still other uses of these products are evident to those skilled in the art.

Having thus described the novel process of our invention, it is not intended that we be restricted except as noted in the appended claims.

We claim:

1. A process for the manufacture of metal cyanates which comprises premixing a basic metal compound selected from the group consisting of alkali and alkaline earth metal compounds of particle size less than 20 microns with between about the stoichiometric amount and 10 percent in excess thereof of a finely divided urea of particle size less than 20 microns and heating said premix to a temperature above the melting point of said urea.

2. A process for the manufacture of metal cyanates which comprises premixing a finely divided basic metal compound selected from the group consisting of alkali and alkaline earth metal compounds of particle size less than 20 microns with between about the stoichiometric amount and 10 percent in excess thereof of a finely divided urea of particle size less than 20 microns and heating to reaction temperature between about 160° to 180° C.

3. Process of claim 2 wherein said basic metal compound is an alkaline earth oxide.

4. A process for the manufacture of calcium cyanate which comprises premixing calcium oxide with between about the stoichiometric amount and 10 percent in excess thereof of urea wherein the particle size of the oxide and urea is less than about 5 microns, and heating said premix to about 160 to 180° C.

5. The process of claim 2 wherein said metal compound and said urea are present in substantially stoichiometric quantities.

6. A process for the manufacture of calcium cyanate which comprises premixing calcium carbonate with between about the stoichiometric amount and 10 percent in excess thereof of urea wherein the particle size of the carbonate and urea is less than about 5 microns and heating said premix to between about 160 to 180° C.

7. A process for the manufacture of sodium cyanate which comprises premixing sodium carbonate with between about the stoichiometric amount and 10 percent in excess thereof of urea wherein the particle size of the carbonate and urea is less than about 5 microns and heating said premix to between about 160 to 180° C.

References Cited in the file of this patent

UNITED STATES PATENTS

| | | |
|---|---|---|
| 1,915,425 | Kloepfer | June 27, 1933 |
| 2,665,968 | Bucci | Jan. 12, 1954 |
| 2,683,648 | Robson | July 13, 1954 |
| 2,729,541 | Pree et al. | Jan. 3, 1956 |

FOREIGN PATENTS

| | | |
|---|---|---|
| 339,220 | Great Britain | Dec. 4, 1930 |